(12) United States Patent
Riesterer et al.

(10) Patent No.: US 6,176,779 B1
(45) Date of Patent: Jan. 23, 2001

(54) COTTON COMPACTOR CONTROL

(75) Inventors: James William Riesterer, Des Moines; Richard Louis Nelson, Cedar Falls, both of IA (US)

(73) Assignee: Deere & Company, Moline, IL (US)

(*) Notice: Under 35 U.S.C. 154(b), the term of this patent shall be extended for 0 days.

(21) Appl. No.: 09/239,239

(22) Filed: Jan. 28, 1999

(51) Int. Cl.⁷ .................................................. A01D 46/08
(52) U.S. Cl. ............................. 460/119; 56/16.6; 56/28
(58) Field of Search ........................... 56/16.6, 28, 30, 56/344, 345; 460/8, 114, 119; 414/300, 318, 328, 329, 397, 526, 492, 525.2, 525.6, 813

(56) References Cited

U.S. PATENT DOCUMENTS

| 4,294,327 | * | 10/1981 | Howard | 180/273 |
| 4,744,207 | * | 5/1988 | Hanley et al. | 56/16.6 |
| 4,793,126 | | 12/1988 | Wood et al. | 56/16.6 |
| 4,888,940 | | 12/1989 | Deutsch | 56/16.6 |
| 4,930,297 | * | 6/1990 | Schlueter et al. | 56/16.6 |
| 5,173,866 | * | 12/1992 | Neumann et al. | 414/525.2 |
| 5,529,537 | * | 6/1996 | Johnson | 460/119 |
| 5,533,932 | | 7/1996 | Covington et al. | 460/119 |
| 5,584,762 | | 12/1996 | Buhler et al. | 460/119 |
| 5,770,865 | | 6/1998 | Steffen et al. | 250/577 |
| 5,950,408 | * | 9/1999 | Schaedler | 56/202 |
| 5,957,773 | * | 9/1999 | Olmsted et al. | 460/7 |

OTHER PUBLICATIONS

John Deere, Install Basket Full Monitoring System instructions, five pages, publication date—1998, published in U.S.A.

* cited by examiner

Primary Examiner—Robert E. Pezzuto
Assistant Examiner—Nathan Mammen

(57) ABSTRACT

A compactor for a cotton harvester basket includes an automatic compactor auger control system having a pair of optical sensors mounted in the basket utilizing light blockage to detect a preselected level of cotton in the basket. When the preselected cotton level is reached, a full basket signal is sent to a microprocessor based controller which activates the compactor augers if certain interlock conditions are satisfied. The microprocessor control maintains the augers in operation until the cotton is compacted below the preselected level so the light signal is no longer blocked. An adjustable timer assures compactor operation for a minimum period of time to prevent short, intermittent periods of operation when the basket is filling and permits timing adjustments to accommodate varying cotton conditions.

20 Claims, 6 Drawing Sheets

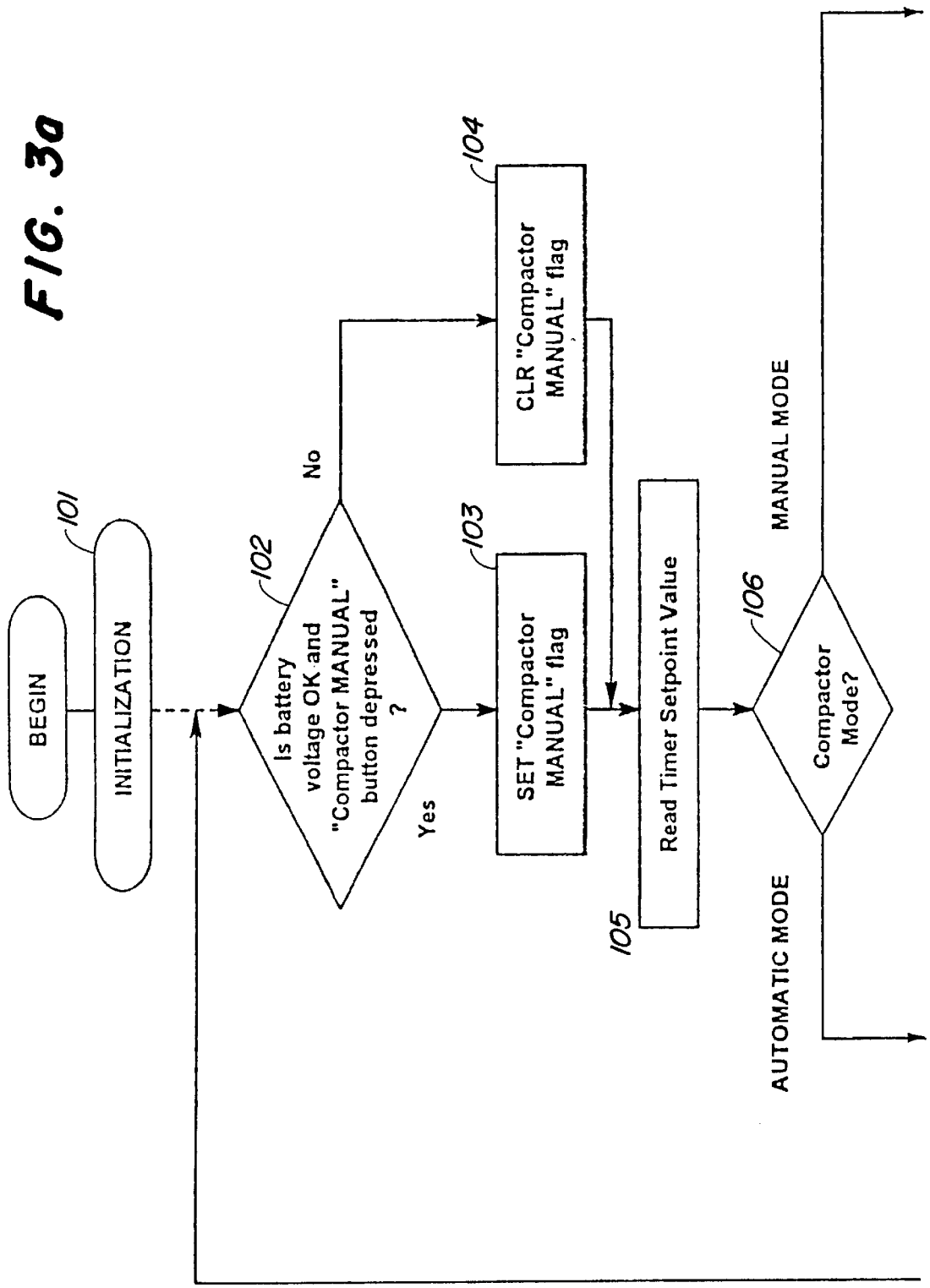

COTTON COMPACTOR CONTROL

BACKGROUND OF THE INVENTION

1) Field of the Invention

The present invention relates generally to harvester receptacles, and, more specifically, to a compactor control for the compactor in a cotton harvester basket.

2) Related Art

Cotton harvesters typically include a large cotton receptacle and a compacting device to increase the density of the cotton in the receptacle. Pivoting vanes, such as shown in U.S. Pat. No. 4,793,126, and compacting augers such as shown in U.S. Pat. No. 4,888,940 are operated manually from a control in the harvester cab. An example of a compacting system with a manually operated switch in the cab is shown in U.S. Pat. No. 5,533,932. Cotton spillage can be a problem with manually operated systems if the operator fails to activate the compacting device at the correct time. Spillage wastes cotton and requires time-consuming cleanup to clear the chassis and platform.

The operator has numerous functions to monitor, and the need for manual activation of the compacting control hinders concentration on other areas of the harvesting operation. Systems including a basket full sensor of the type shown and described in U.S. Pat. No. 5,770,865 have provided a signal to the operator to activate the compacting augers, but still require operator attention and intervention. Various automatic timing arrangements such as preset timers to set the timing between consecutive compactor auger operations have also been available. These have alleviated some of the problems with purely manual operation but often do not provide the best compacting operation to optimize cotton density in the receptacle and reduce cotton spillage.

BRIEF SUMMARY OF THE INVENTION

It is therefore an object of the present invention to provide an improved cotton harvester basket compacting system which overcomes most or all of the aforementioned problems.

It is a further object of the present invention to provide an improved cotton harvester basket compacting system which reduces cotton spillage and optimizes cotton density in the harvester basket. It is another object to provide such a system which requires less operator attention and intervention than at least most previously available systems.

It is another object to provide an improved cotton harvester basket compacting system which obviates compacting controls with timers that are manually adjusted or otherwise operate on timed cycles not dependent directly on basket filling condition.

In accordance with the above objects, a compactor for a cotton harvester basket includes an automatic compactor auger control system having a pair of optical sensors mounted in the basket utilizing light blockage to detect a preselected level of cotton in the basket. When the preselected cotton level is reached, a full basket signal is sent to a microprocessor control which activates the compactor augers if certain interlock conditions are satisfied. The microprocessor control maintains the augers in operation until the cotton is compacted below the preselected level so the light signal is no longer blocked. An adjustable timer assures compactor operation for a minimum period of time to prevent short, intermittent periods of operation when the basket is filling. In addition, the ability to adjust the timer duration in accordance with cotton density provides improved system flexibility.

The control system eliminates need for manual operation of the compactor and frees the operator for concentrating on other tasks. The automatic operation directly dependent on basket full condition provides a more consistent starting point, better compacting and less spillage than many of the manual or other types of timed operation compactor systems. A manual activation switch conveniently located on a control handle in the cab allows the operator to manually engage the augers. Productivity is increased as a result of the controlled compacting which maximizes the amount of cotton in the basket.

These and other objects, features and advantages of the present invention will become apparent to one skilled in the art upon reading the following detailed description in view of the drawings.

BRIEF DESCRIPTION OF THE DRAWINGS

FIGS. 3a–3d is a flow chart for the microprocessor program for the system of FIG. 2.

DETAILED DESCRIPTION OF THE DRAWINGS

Figure 1:
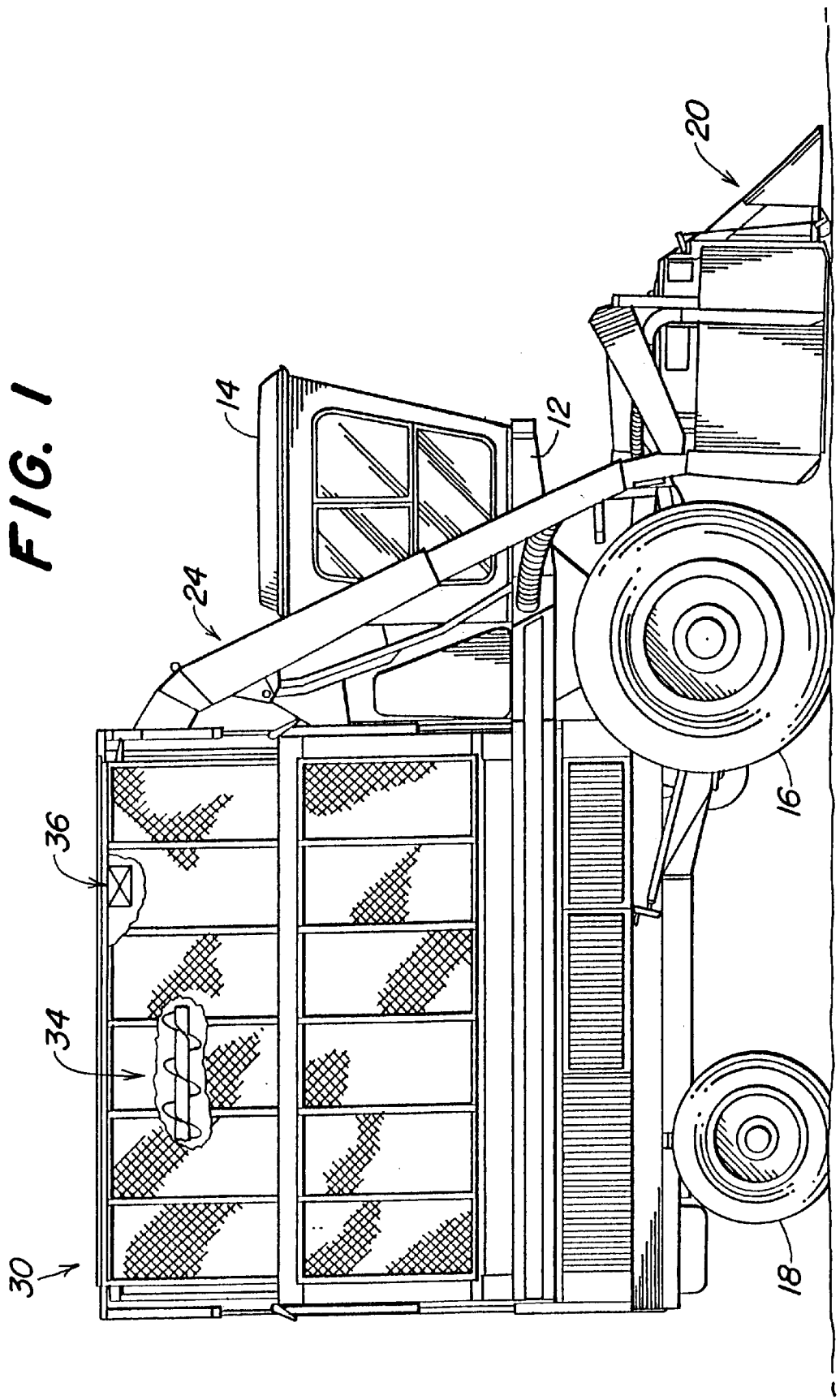
FIG. 1 is a side view of a cotton harvester with a full basket sensor attached thereto.

Referring now to FIG. 1, therein is shown a cotton harvester 10 having a main frame 12 with an operator station or cab 14 supported for forward movement over a field of cotton plants by forward drive wheels 16 and rear steerable wheels 18. Cotton harvester row units 20 are supported on the forward end of the frame 12 for removing cotton from the plants, and an air duct system 24 conveys the cotton rearwardly and upwardly to the forward, upper end of a large cotton basket 30 supported on the frame 12. Hydraulically driven compacting augers 34 are supported for rotation about fore-and-aft extending axes in the upper portion of the basket 30. Basket full sensors 36 of the type shown and described in U.S. Pat. No. 5,770,865 are supported in the upper portion of the basket just rearwardly of the area where cotton from the ducts of the system 24 enters the basket and are connected to a basket full indicator located in the cab 14. A control circuit 40 (FIG. 2) including a microprocessor based controller 41 provides for automatic operation of the augers 34 to compact and move cotton rearwardly in the basket 30 when the sensors 36 indicate a full condition as the level of cotton approaches the top of the basket or when the operator of the harvester manually switches on the augers. The control circuit 40 maintains the augers 34 on until the sensors 36 detect that a basket full situation no longer exists. An adjustable timer control 42 is provided to assure that the augers 34 operate for a minimum period of time in the automatic mode, that period being determined by a control knob 44 located in the harvester cab 14 and connected to a variable resistor. If the timer control times out and the sensors 36 still indicate a basket full condition, the augers will remain in operation. The controller 41 includes an output 46 connected to an electrohydraulic valve 48 which, when activated by the controller, provides hydraulic drive to the augers 34.

Figure 2:
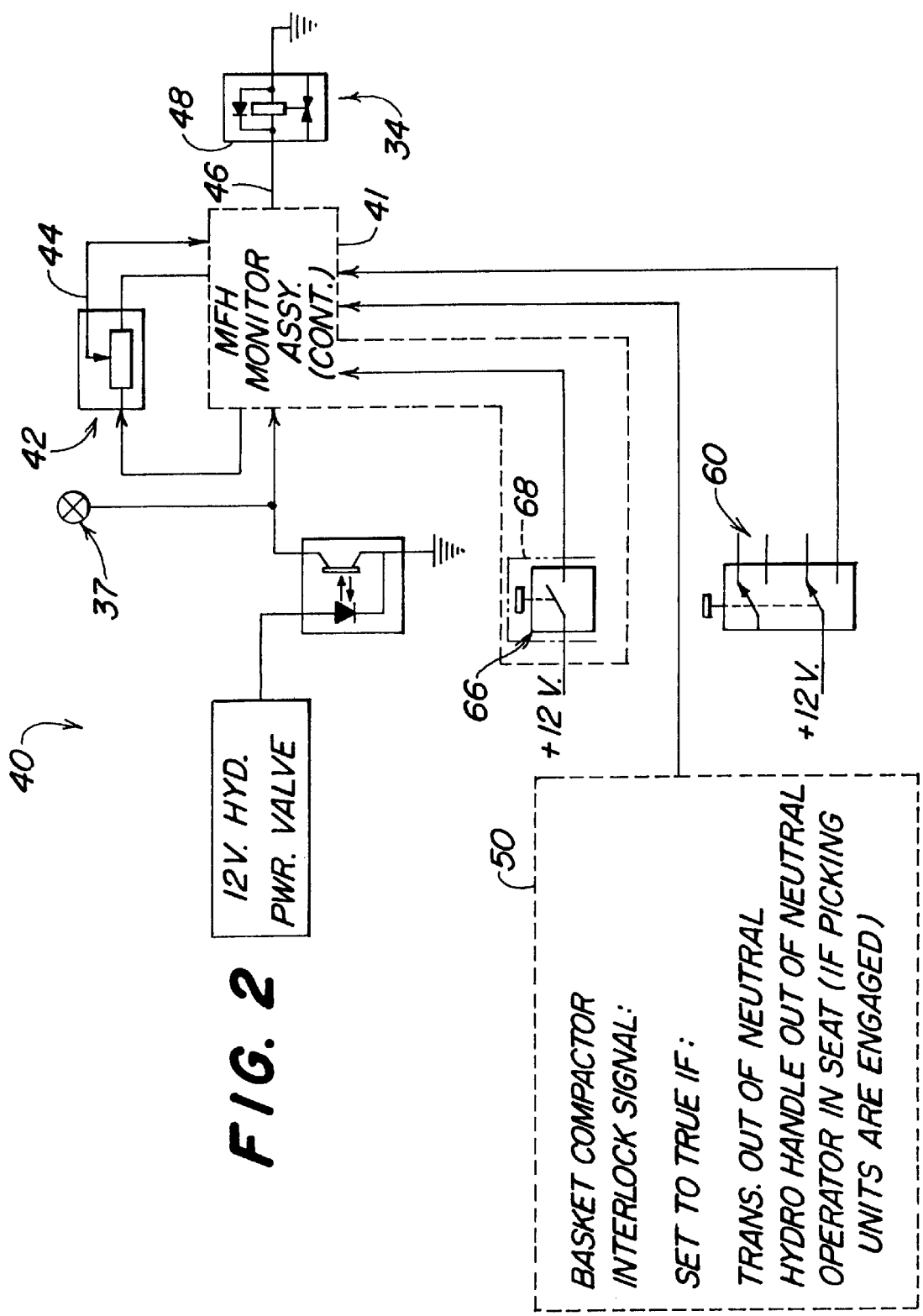
FIG. 2 is a schematic of the compactor auger control system for the harvester of FIG. 1.

Interlock circuitry indicated generally at 50 in FIG. 2 is connected to the controller 41 to enable automatic auger operation only if certain conditions exist on the harvester. As shown, automatic operation of the augers 34 can occur only if the harvester transmission and hydraulic drive (hydro) control are both out of neutral and the operator is in his seat in the cab 14. If any of these three conditions are not present, automatic auger operation is prevented.

A mode select switch 60 connected to a source of hydraulic valve power 62 and to the controller 41 provides for operation of the compactor 34 in either the automatic mode or a manual mode. Automatic operation of the augers is prevented when the switch 60 is in the manual mode. A manual operation switch 66 allows the operator to activate the augers 34 independently of the position of the mode select switch 60, the state of the timer control 42, or the presence of a basket full indication from the sensors 36. By depressing the switch 66, which is conveniently located on the hydro control handle (see 68 of FIG. 2), the compactor will be engaged.

Referring now to FIGS. 3a–3d, the microprocessor program will be described below. Upon initialization (101 of FIG. 3a), the controller checks to see that no switch controls are stuck in the on position. If a control is stuck on, a button stuck flag is set. The battery voltage and manual control button on the switch 66 are checked at step 102 and, if the manual button is depressed, the manual flag is set at 103. If the manual mode is not selected or the battery voltage is not okay, the manual flag is cleared at 104. The set point of the timer control 42 is then checked at 105, and the state of the switch 60 is polled at 106.

If the switch 60 is in the automatic position, the interlock conditions are checked (108 of FIG. 3b) to see if the transmission is out of neutral, the hydro handle is engaged and the operator is at the operator station. If all the interlock conditions are met, the sensors 36 are checked to see if a basket full condition is indicated (110); if so and if the basket full was not indicated on (by a basket full status flag) the previous pass (112), the basket full status flag is set at 114, the compactor on timer is cleared, and the compactor command flag is set. If the interlock conditions are not satisfied at step 108, the basket full status, compactor on timer, and compactor clear flag are cleared (118).

The compactor on time is then checked (120 of FIG. 3c) and, if the time is less than the setpoint determined by the control 44, the on time register is incremented (122) by the program loop time and then checked again (124) to see if the time is equal to or greater than the setpoint point time. If so (or if in step 120 the compactor on time was determined to be greater than the setpoint), the basket full sensors 36 are polled (126). If a basket full condition is indicated by the sensors, the program proceeds immediately to the auger on or off code 130 (FIG. 3d). If a basket full condition is not detected at step 126, the basket full status and the compactor command flag are cleared prior to continuing to the code 130.

Figure 3B:
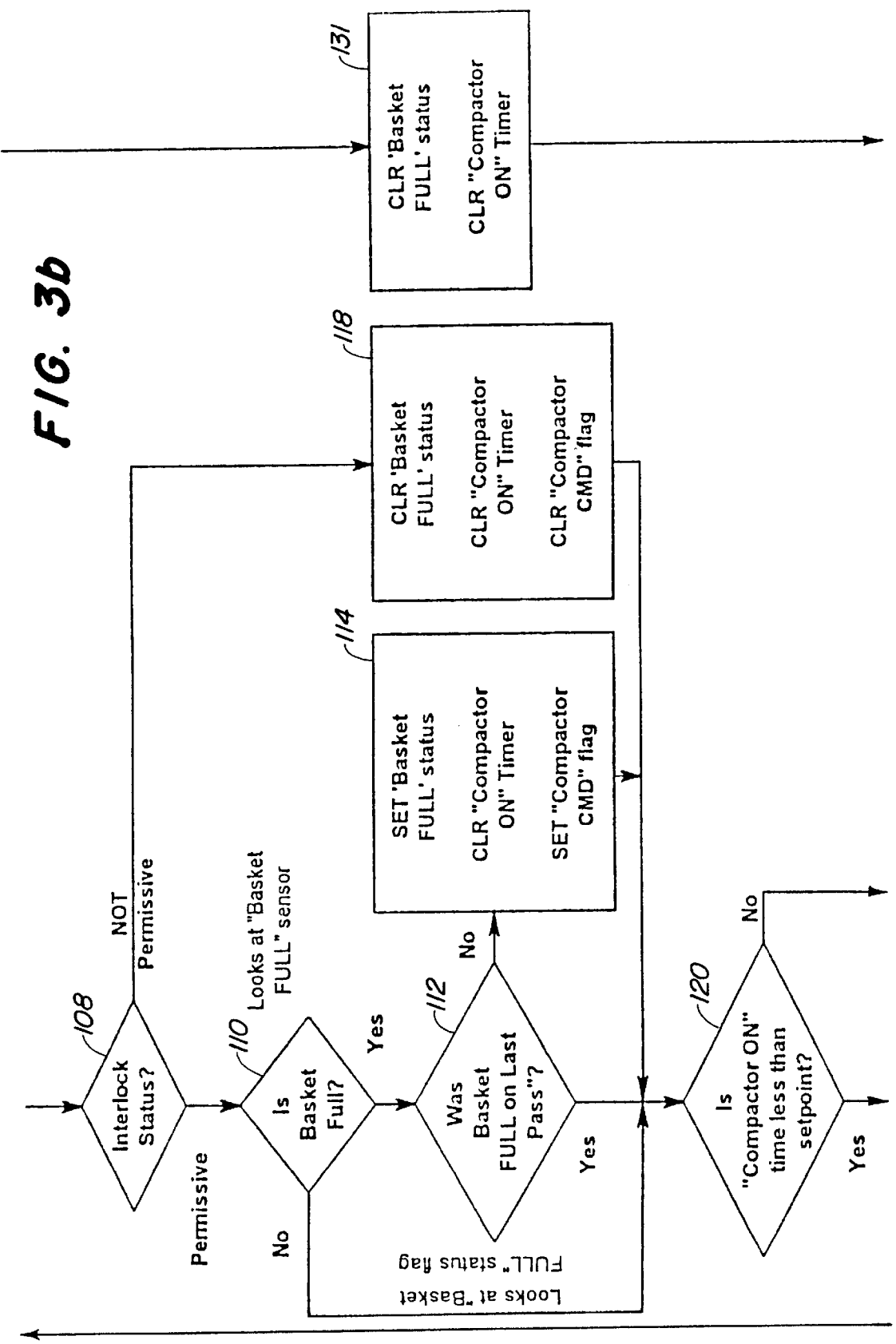
Figure 3C:
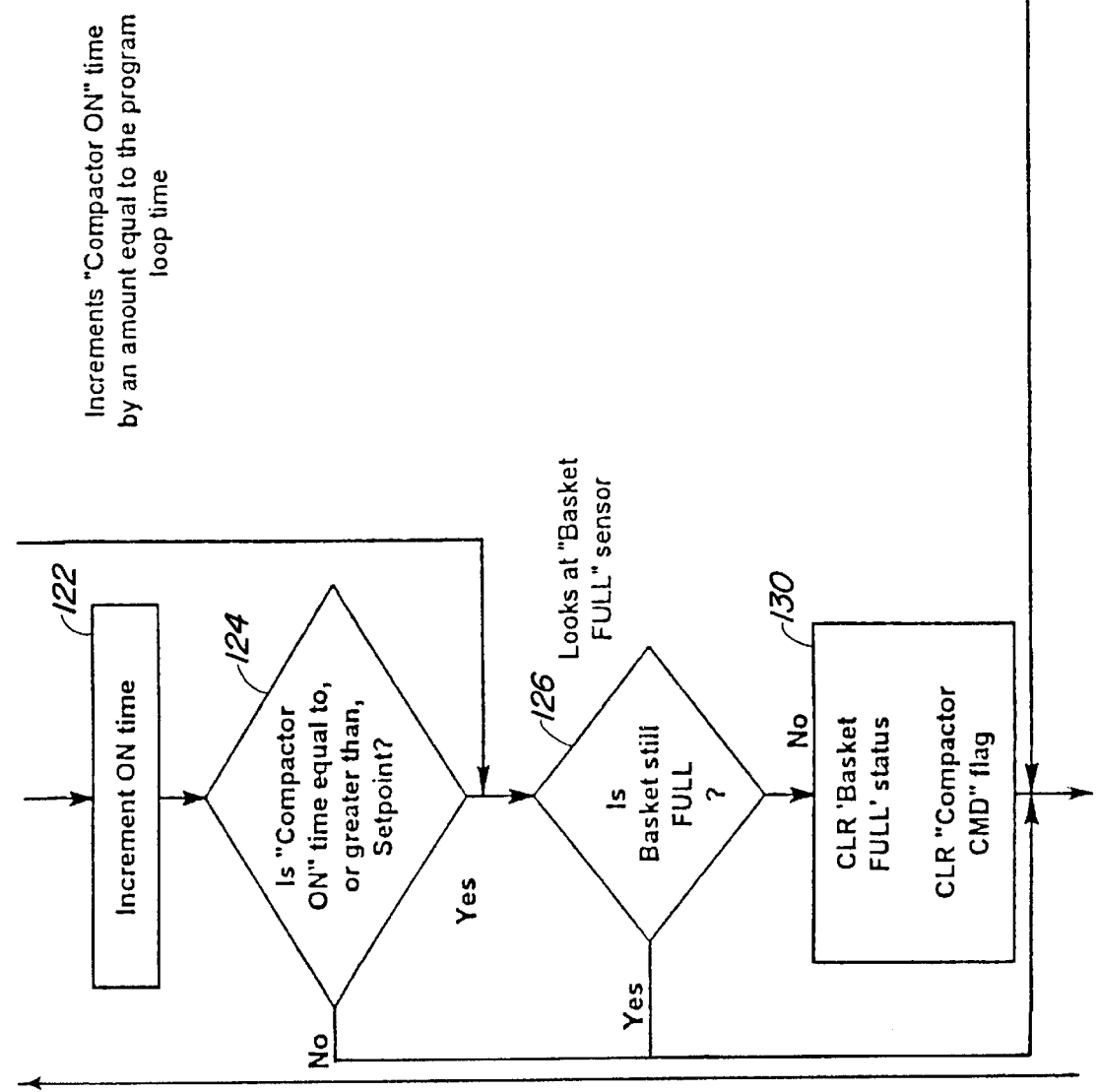
Figure 3D:
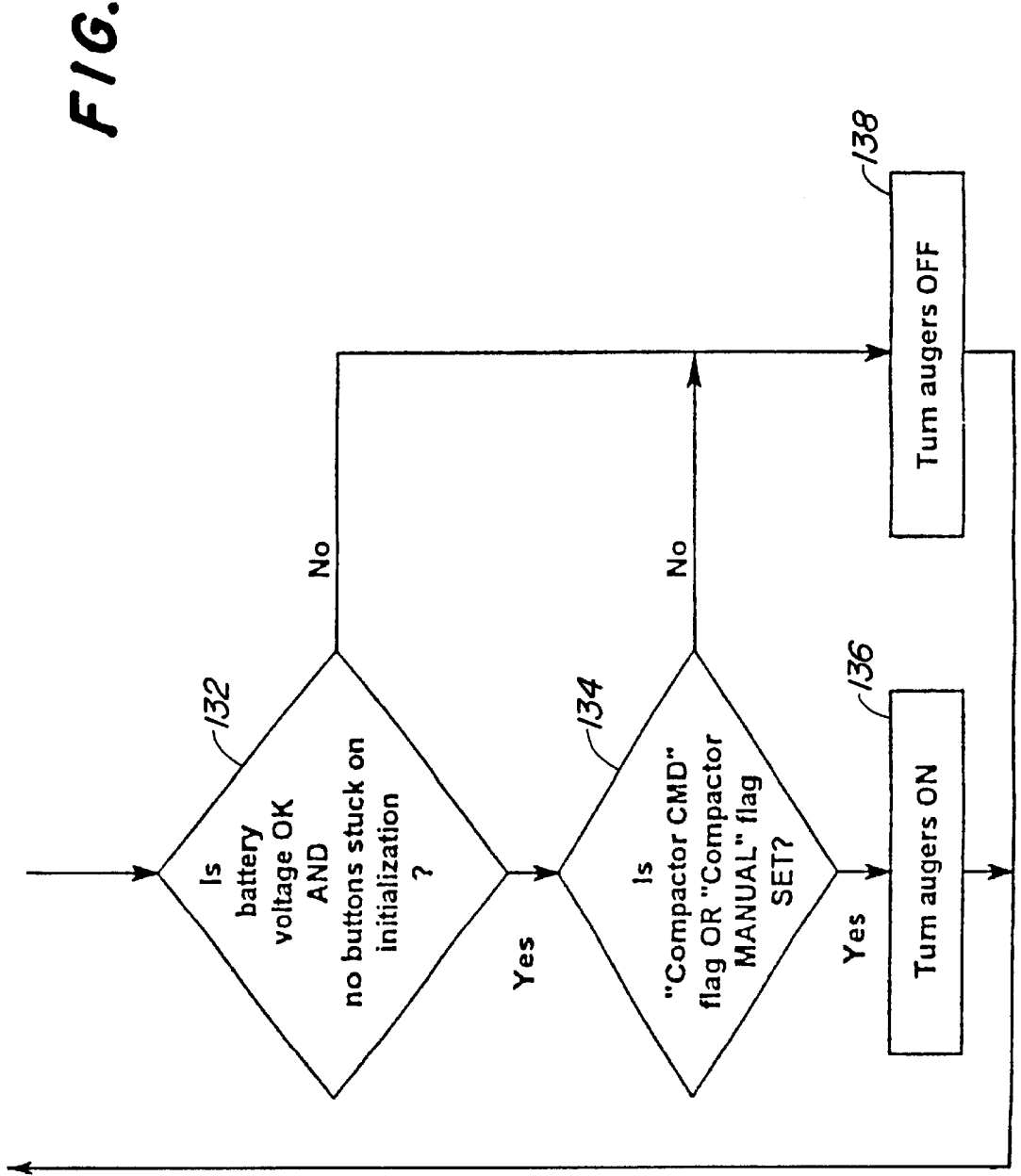

If at step 106 (FIG. 3a) it is determined that the compactor mode switch 60 is in the manual mode position, the program proceeds directly to the auger on or off subroutine 130 (FIG. 3d) after clearing the basket full status and compactor on timer (131 of FIG. 3b). First the battery voltage is checked to be sure it is within the proper range and the button stuck flag checked (132) to be sure no buttons were indicated to be stuck on initialization. If the conditions are satisfied, the compactor command flag and the compactor manual flag are checked (134) to see if either is set. If so, the augers are turned on (136) and the routine returns to step 102 of FIG. 3a. If the battery voltage is low or a stuck button is indicated (132), the augers are turned off (138). The augers are also turned off if it is determined at step 134 that neither the compactor command flag nor the compactor manual flag is set.

Having described the preferred embodiment, it will become apparent that various modifications can be made without departing from the scope of the invention as defined in the accompanying claims.

We claim:

1. In a cotton harvester having an operator station, a basket for receiving cotton removed from cotton plants, and a compactor including an operable compactor drive for compacting and increasing the density of the cotton in the basket, a compactor control system comprising:
   a sensor responsive to the level of cotton in the basket and providing a cotton level indication when the cotton reaches a preselected level in the basket; and
   a control circuit connected to the sensor and to the compactor drive and responsive to the cotton level indication, the cotton level indication automatically initiating the drive whereby drive initiation is dependent on the cotton reaching the preselected level.

2. The control system as set forth in claim 1 wherein the control circuit includes a timer maintaining the drive operation for a preselected period of time after the automatic initiating of the drive regardless of the cotton level indication.

3. The control system as set forth in claim 2 wherein the timer includes an operator adjustment for changing the preselected period of time.

4. The control system as set forth in claim 1 further including an interlock preventing operation of the compactor drive when the operator is away from the operator station.

5. The control system as set forth in claim 1 including a manual override switch connected to the control circuit, the override switch permitting manual operation of the compactor drive independently of the cotton level indication.

6. In a cotton harvester having an operator station, a basket for receiving cotton removed from cotton plants, and a compactor including an operable compactor drive for compacting and increasing the density of the cotton in the basket, a method of controlling the compactor, comprising:
   sensing the level of cotton in the basket and providing a basket fill indication when the cotton reaches a preselected level in the basket;
   the basket fill indication automatically initiating compactor drive operation when the cotton reaches the preselected level in the basket monitoring cotton level in the basket during compactor drive operation; and
   continuing compactor drive operation while the basket fill indication is provided.

7. The control method as set forth in claim 6 further including the step of maintaining the compactor drive operation for a preselected period of time after the automatic initiating of the drive regardless of the cotton level indication.

8. The control method as set forth in claim 7 including the step of providing a timing adjustment to vary the preselected period of time.

9. The control method as set forth in claim 6 further including the steps of monitoring the presence of an operator at a preselected location on the harvester and preventing compactor drive operation when the operator is away from the preselected location.

10. The control method as set forth in claim 6 including the step of providing a manual override switch and permitting manual operation of the compactor drive independently of the cotton level indication.

11. The control method as set forth in claim 10 wherein the step of providing a manual override switch includes providing the override switch on a hydraulic control handle.

12. In a harvesting implement having a storage receptacle for receiving harvested crop and a driven distributor for distributing the crop within the receptacle, a distributor drive control comprising:

a level detector supported by the receptacle and providing an output signal in response to the crop reaching a preselected level in the receptacle;

a distributor drive having an activated condition and an inactivated condition;

a controller connected to the level detector and the distributor drive;

an adjustable timer control connected to the controller;

the controller, in response to the output signal, automatically activating the distributor drive for a minimum time period determined by the timer control when the crop reaches the preselected level in the receptacle; and wherein the controller is responsive to the output signal to maintain the distributor drive control in the activated condition beyond the minimum time period if the crop is at or above the preselected level at the end of the minimum time period.

13. The distributor drive control as set forth in claim 12 further including a mode switch having a manual mode position and an automatic mode position, wherein automatic drive actuation is provided only when the mode switch is in the automatic mode position.

14. The distributor drive control as set forth in claim 13 wherein the harvesting implement includes an implement drive control and further including a manual activation switch on the drive control for activating the distributor drive when the mode switch is in either the automatic mode position or the manual mode position.

15. The distributor drive control as set forth in claim 12 further including an interlock circuit connected to the controller and preventing automatic drive actuation if preselected conditions are absent on the implement.

16. The distributor drive control as set forth in claim 15 wherein the preselected conditions include an implement drive condition.

17. The distributor drive control as set forth in claim 15 wherein the preselected conditions include engagement of a transmission.

18. The distributor drive control as set forth in claim 14 wherein the manual operation switch and the mode switch are connected to a source of valve power and prevent distributor drive in the absence of the valve power.

19. The distributor drive control as set forth in claim 12 wherein the distributor comprises a hydraulically driven cotton compactor and the level detector comprises an optical detector connected to the receptacle.

20. The distributor drive control as set forth in claim 12 including a manual switch for manually activating the distributor drive independently of the level detector output signal and the timer control.

* * * * *